Jan. 29, 1957 R. C. HAWES 2,779,921
DYNAMIC AMPLIFIER
Filed Dec. 5, 1951 2 Sheets-Sheet 1

INVENTOR.
ROLAND C. HAWES
BY HIS ATTORNEYS.
HARRIS, KIECH, FOSTER & HARRIS
BY
Terence F. Kiech Jan. 29, 1957 R. C. HAWES 2,779,921
DYNAMIC AMPLIFIER
Filed Dec. 5, 1951 2 Sheets-Sheet 2

INVENTOR.
ROLAND C. HAWES
BY HIS ATTORNEYS.
HARRIS, KIECH, FOSTER & HARRIS
BY

United States Patent Office 2,779,921
Patented Jan. 29, 1957

2,779,921

DYNAMIC AMPLIFIER

Roland C. Hawes, Los Angeles, Calif., assignor to Beckman Instruments, Inc., South Pasadena, Calif., a corporation of California Application December 5, 1951, Serial No. 259,973

7 Claims. (Cl. 324—102)

This invention relates to circuits for amplifying and/or measuring electronic signals of small magnitude and the general object of the invention is to provide a simple, reliable and inexpensive basic circuit that may be adapted to various specific purposes involving the power amplification of signals of small magnitude.

One object of the basic invention is to provide a power amplifier that functions without an input resistor. In effect, the amplifier circuit may be used as a substitute for a high-value resistor. Its utility for this purpose may be appreciated when it is considered that an exceedingly high-value resistor for use with an input current of very small magnitude is relatively expensive, as well as difficult to fabricate with accuracy, whereas a resistor of relatively low ohmic value for use with amplified current is both inexpensive and accurate.

A further object of the invention is to provide such an amplifier that may, if desired, be embodied in a relatively small portable device energized by relatively small battery means.

An important feature of the invention is that the power of the input signal may be amplified either primarily with respect to current or primarily with respect to voltage, as may be desired.

In its application to current signals, a further important object of the invention is to provide a dynamic amplifier to serve as a rate meter for the accurate measurement of small currents from high impedance sources.

Another object with reference to current signals is to provide an exceedingly simple and rugged power amplifier that has an exceedingly high current amplification factor and in which amplification is not affected by changes in the voltage source.

A still further important object of the invention is to provide a differentiating amplifier to detect and/or measure rates of change of an input signal. The same basic circuit that may be employed to amplify the current of an input signal characteristically responds to an input voltage signal by reflecting the rate of change of the voltage. In this aspect, the invention has utility for such purposes as measuring the rate of change of a chemical reaction and measuring the rates of change of such variables as velocity, temperature, pressure, etc.

In general, these objects are attained by the steps of placing the input control element of an amplifier in responsive communication with a signal, providing an output circuit for the amplifier with a capacitive medium of charge transfer therein, and providing coupling for feedback from the output circuit to the input.

The capacitive medium of charge transfer permits the storage of energy in the output circuit with a voltage drop across the amplifier. A signal communicated to the input control element causes output current flow with consequent reduction of the voltage drop across the amplifier and eventually the circuit must be reset to restore the voltage drop for further operation.

In the functioning of such a circuit with feedback coupling to the input, a continuous voltage balance is maintained in the sense that a voltage change across the capacitive medium in the output circuit constantly equals the voltage change at the input control element. Usually the feedback coupling is provided by an input capacitance. In this case, any input current applied to the input control element is amplified by a factor substantially equal to the ratio of the output capacitance to the input capacitance. On the other hand, voltage amplification may be obtained by using capacitors in series in the output circuit with the feedback taken from the output circuit at a point between the output capacitors. Thus, the power amplification of the signal may be in current amplification, or in voltage amplification, or in both. The above, and other objects and advantages of the invention, will be readily understood from the following detailed description, considered with the accompanying drawings.

In the drawings, which are to be regarded as merely illustrative:

Figure 5:
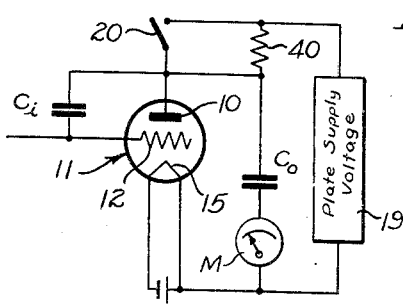
Figure 6:
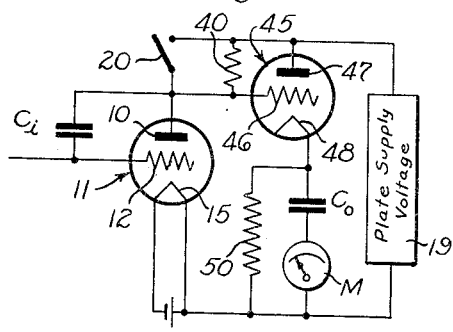
Figure 7:
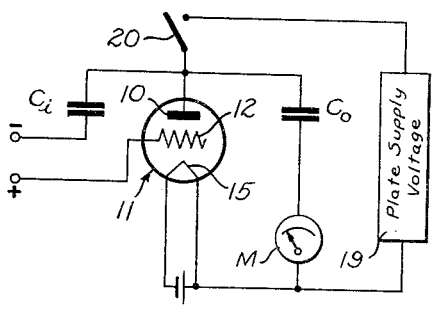
Figure 8:
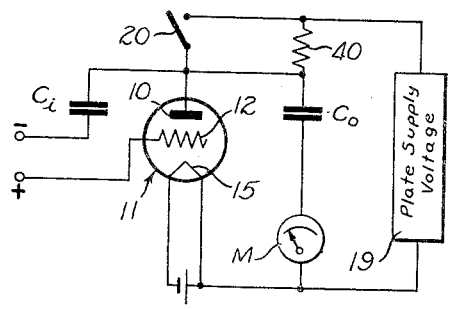
Figure 9:
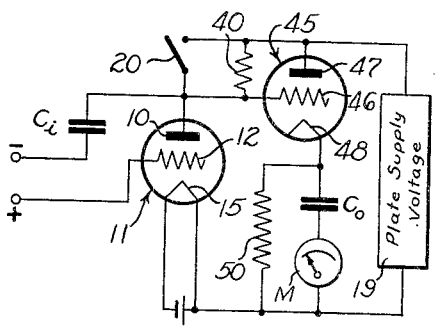
Figure 10:
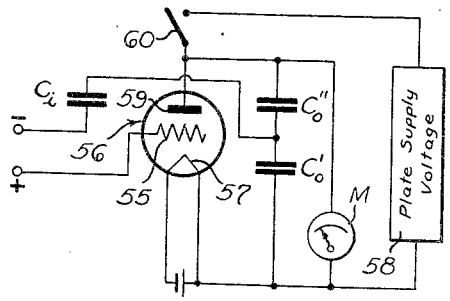

Fig. 5 adds a resistance to the basic circuit to shift the range of operation on the characteristic curve of the vacuum tube;

Fig. 6 adds a cathode follower to Fig. 5;

Fig. 7 shows the basic circuit modified for response to voltage signals as distinct from current signals; and Figs. 8 and 9, corresponding to Figs. 5 and 6, respectively, are typical circuits adapted for response to voltage signals; and Fig. 10 is a modification of the basic circuit for power amplification by amplification of voltage in the output of the circuit.

Figure 1:
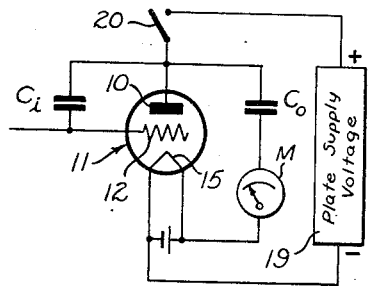
Figure 1 is a diagram of the basic circuit.

In the basic circuit shown, by way of example, in Fig. 1, the anode 10 of a vacuum tube 11 is coupled with the grid 12 of the tube by a relatively small capacitor $C_i$, herein termed the "input capacitor." A second and much larger capacitor $C_o$, herein termed the "output capacitor," couples the anode 10 with the cathode 15 of the tube. In this arrangement, the anode 10, the cathode 15 and the output capacitor $C_o$ form what may be termed an "output circuit" and the output capacitor $C_o$ in the output path serves as a capacitive medium of charge transfer by virtue of which energy may be stored in the output circuit for current flow through the vacuum tube 11.

It is to be understood that the vacuum tube 11 is representative of amplifiers or amplifying devices in general. Within the meaning of the term, an amplifier may comprise a single vacuum tube or a plurality of vacuum tubes or may depend for amplification on some instrumentality other than a vacuum tube. All practices of the invention, however, will involve the use of some kind of input control element, such as the vacuum tube grid, for the control of an output circuit, and all forms of the invention will be further characterized by capacitance in the output circuit as well as coupling for feedback from the output circuit to the input. The input capacitor $C_i$, for example, provides such coupling.

One of the essential functions of the output capacitor $C_o$ is to serve as a medium of charge transfer by virtue of which a voltage may be applied temporarily across the output circuit to establish therein a voltage drop across the amplifier with potential energy in reserve for a period of operation of the output circuit independent of the voltage source. A suitable measuring device M is placed in series with capacitor $C_o$ to measure the current flow in the output circuit. Such a current measuring device may be, for example, a galvanometer or a suitable load resistance used in conjunction with a responsive vacuum tube voltmeter.

Any suitable provision may be made for storing energy in the output circuit when required for operation. In the particular arrangement shown, a suitable voltage source 19 is connected on its negative side with the cathode 15 and is connected on its positive side with the anode 10 by a suitable switch means 20, thus forming what may be termed a resetting circuit. The voltage source 19 may be a rectifier energized by a source of alternating current, or may be a simple battery. The switching means 20 may operate automatically for periodically resetting the output circuit, but is here shown as a simple manually operable switch.

The switch 20 may be of the normally open type to be manually closed momentarily whenever the potential difference across the anode and cathode of the vacuum tube 11 drops too low. On the other hand, in some practices of the invention a normally closed switch may be used to keep the output capacitor C₀ fully charged between periods of use, the switch being opened manually and held open whenever it is desired to place the output circuit in operation for a brief period of time.

When the resetting circuit is closed by switch 20 in the absence of any signal to affect grid 12, the grid is drawn positive by the input capacitor $C_i$, and, when the grid reaches a potential at which the sum of the grid currents is zero, plate current flows at a rate governed by the normal parameters of the tube.

If the switch 20 is now opened to cut off voltage source 19, tube 11 continues to draw current, but now the current discharges the output capacitor $C_o$. The plate voltage falls and through the input capacitor $C_i$ forces grid 12 negative. Since no signal is influencing grid 12, the grid shifts negatively to "cut off" voltage and current ceases. The output circuit is now set or readied for its intended function since the output capacitor $C_o$ is left with a substantial charge available to energize the circuit.

If grid 12 is now connected to a high impedance signal current source with polarity to result in electron loss by the grid, the grid responds to the signal by becoming more positive and causing output current flow through the tube supplied by the charged output capacitor $C_o$. This plate flow acting through the input capacitor $C_i$ maintains grid 12 at an equilibrium potential with the plate current from the output capacitor proportional to the signal current.

Figure 2:
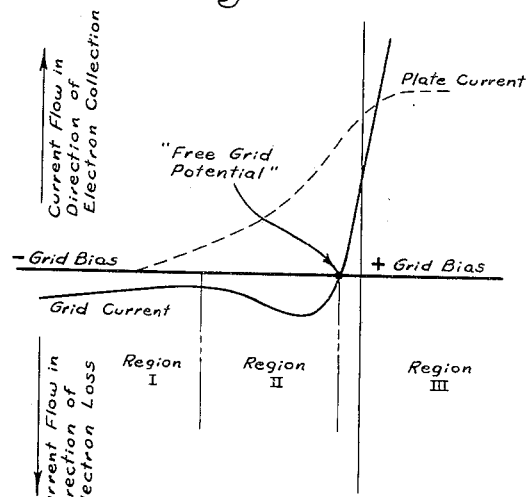
Fig. 2 is a diagram showing how changes in the grid current vary with changing grid potential.

In analyzing the action of the circuit in the described cycle, grid current must be taken into consideration, as may be understood by referring to the diagram of Fig. 2. Since the grid current is complex, it is noted on the diagram in terms of collection or loss of electrons. It will be noted that grid current is never reduced to zero and since it is in the direction to cause plate current to flow, it sets a lower limit on the detection function of the circuit. This minimum is very low, however.

In region I of Fig. 2 where the grid potential is at or near cut-off, the grid currents are mainly leakage currents since the grid is the most negative element of the tube and little or no plate current is flowing. This condition prevails when the output circuit is set or readied to respond to a signal, an ample charge existing across the output condenser $C_o$.

In response to a signal current the grid potential changes positively to enter region II where many other factors contribute to the grid current, the actual shape of the grid current curve depending on such factors as geometry, type of emitter, gas pressure in the tube, etc. As the grid potential approaches the cathode potential, electron collection from the cathode, i. e., tube space current, becomes a major factor and finally at the "free grid potential" indicated in Fig. 2 the collection and loss of electrons at the grid are equal and a stable condition is reached. In region III grid currents are predominantly electron collection.

In the operation of the circuit in Fig. 1 to measure a current signal, the signal current flows into the input capacitor $C_i$ to produce a change in voltage across the capacitor and thus place a signal on the grid 12. The rate of change of voltage between grid 12 and anode 10 produces a substantially equal rate of change of voltage across output capacitor $C_o$. Since the rate of change of voltage at the input capacitor is reflected by the amplifier to the output capacitor $C_o$ and since the amount of current available from a capacitor at a given voltage drop across the capacitor varies with the capacitance, current amplification by the circuit is substantially equal to the ratio of the capacitance of $C_o$ to the capacitance of $C_i$. Thus, if $I_i$ is the input current, the magnitude of the output current $I_o$ in the operating plate circuit will be $$I_i \frac{C_o}{C_i}$$

The ratio $$\frac{C_o}{C_i}$$

may be quite high. For example, the value of $C_i$ may be approximately ten micro-microfarads and the value of $C_o$ one-tenth of a microfarad to give a ratio of about ten thousand. Capacitor $C_o$ should be designed for low leakage since such leakage reduces accuracy.

It can readily be appreciated from the foregoing that the flow of current in the output circuit is a dynamic measurement and therefore the circuit operates as a rate meter reflecting changes in magnitude of the input signal current.

Over a wide range of values the plate characteristics of the tube need not be considered in many practices of the invention, but the fact that the plate voltage varies in the course of a measurement should be kept in mind. If a triode tube is used the responsiveness of the grid to falling plate voltage will necessitate a compensating correction in reading the value of M. The need for such correction may be reduced by using a screen grid tube with the screen held at a constant potential or by using a well-designed pentode, but even the substitution of a pentode does not eliminate the need for such correction when a high degree of accuracy is sought.

There will be some lower limit of plate voltage below which the circuit fails to function in the manner described, but it is contemplated that the output circuit will be periodically reset to keep the plate voltage above the lower limit. The plate voltage may be monitored with means responsive to the plate voltage to indicate when resetting of the circuit is necessary.

It is also practical to add means such as a neon tube to reset the output circuit in response to the dropping of the plate voltage to a predetermined value above the aforesaid lower limit. Such an arrangement is shown in Fig. 3, as will now be explained.

Figure 3:
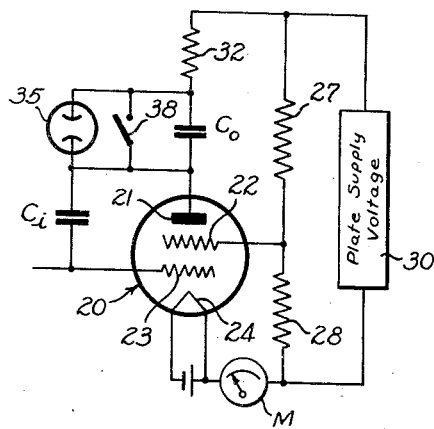
Figs. 3 and 4 are modifications of the basic circuit incorporating a neon tube for automatic resetting of the circuit.

Fig. 3 includes a tetrode 20 having an anode 21, screen grid 22, control grid 23 and cathode 24. For stabilization the screen grid 22 is connected between two resistances 27 and 28 placed in series across the voltage supply 30. As in the previously described circuit, the input capacitor $C_i$ is connected between the anode 21 and the control grid 23. The output circuit includes a resistance 32 and an output capacitor $C_o$ in series with the anode 21, this circuit being completed by the two resistances 27 and 28. A suitable current measuring device M may be placed in this circuit, Fig. 3 showing the device M between the cathode 24 and the resistance 28.

To serve as an automatic switch, a glow discharge tube 35, in this instance a neon tube, is connected across capacitor $C_o$. This tube 35 becomes conducting whenever the potential difference across its two electrodes rises to the particular firing potential of the tube. As soon as the tube fires, however, the potential difference across the tube drops immediately because of the presence of impedance in series in the circuit, which impedance includes the resistance 32 as well as the resistance offered by the vacuum tube 20. It is contemplated that these impedance values in the circuit will be such that when the neon tube 35 fires, the potential difference across the tube will immediately drop below the extinction potential of the tube and the tube will stop conducting.

The current flow in the output circuit caused by the potential difference between the anode 21 and the cathode 24 progressively lowers the potential of the anode and correspondingly increases the potential drop both across the capacitor $C_o$ and across the neon tube 35. Eventually the neon tube fires and thereby resets the output circuit by discharging the capacitor $C_o$ and correspondingly increasing the potential drop across the cathode and anode. This action occurs as often as necessary to keep the output circuit sufficiently energized for its function of measuring the signal current that is communicated to the control grid 23.

Figure 4:
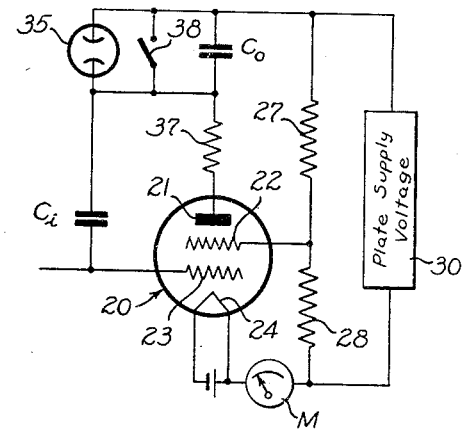

The circuit shown in Fig. 4 is closely similar to the circuit shown in Fig. 3, as indicated by the use of corresponding numerals to indicate corresponding elements of the two circuits. This second circuit differs from the circuit in Fig. 3 in the omission of the resistance 32 and the insertion of a resistance 37 in series between capacitor $C_o$ and the anode 21 of the vacuum tube.

Each of the circuits shown in Figs. 3 and 4 may be provided with a switch 38 in parallel with the neon tube 35 and capacitor $C_o$, if desired. Such a switch may be used to energize the output circuit independently of the neon tube 35 and may be used to warm up the vacuum tube 20 in preparation for a period of operation.

Fig. 5 shows a circuit arrangement similar to Fig. 1 as indicated by the use of corresponding numerals to designate corresponding components.

The purpose of Fig. 5 is to show how a suitable resistance 40 may shunt switch 20 to cause a small amount of current to flow constantly through the amplifier tube 11 from the voltage source 19. Such a resistance of suitable value may be added to shift the range of operation of the tube 11 away from the toe of the characteristic curve of the tube to a more favorable slope on the curve.

Fig. 6 illustrates how the circuit of Fig. 5 may be modified by applying the principle of the cathode follower to the output circuit. Basically, Fig. 6 is similar to Fig. 5 as indicated by use of corresponding numerals to designate corresponding components. In Fig. 6, however, tube 11 serves as an input tube of an amplifier, the amplifier including a second tube 45 which may be termed an output tube. The anode 10 of the input tube 11 is connected to the grid 46 of the output tube 45, as shown, and the anode 47 of the output tube is connected directly to the positive side of the plate supply voltage 19. The cathode 48 of the output tube is connected to the negative side of the voltage supply 19 by an output capacitor $C_o$ in series with a suitable current measuring device M. A suitable cathode resistance 50 connects the cathode 48 directly with the negative side of the plate supply voltage 19 as well as with the cathode 15 of the input tube 11.

Because the resistance 50 is on the cathode side of the output tube 45, the cathode 48 follows changes imposed on the grid 46. Since the potential difference between the cathode 48 and the grid 46 is constant, the circuit arrangement in Fig. 6 functions in the same general manner as the circuit arrangement shown in Fig. 5, there being the same functional relationship between the input capacitor $C_i$ and the output capacitor $C_o$. In fact, because of the close coupling between the grid and the cathode of the cathode follower, one terminal of $C_i$ may be connected to the cathode of the cathode follower instead of to the cathode follower grid and the plate 10 of the input tube.

One important advantage of the form of the invention shown in Fig. 6 is that the input tube 11 is required merely to control the grid 46 of the output tube 45 and is not taxed by the relatively large current displaced through the output capacitor $C_o$. Since the input tube is independent of the output circuit to this extent, it may be operated under its most favorable conditions and at the same time the output capacitor $C_o$ may be increased in size to create greater output current than would otherwise be possible within the limitations of the input tube 11.

Another feature of the circuit in Fig. 6 of importance in some practices of the invention is the low output impedance.

The remaining Figs. 7 to 10 show the basic circuit in various adaptations for responding to changes in a voltage signal as distinguished from a current signal. In this capacity, as heretofore stated, the circuit serves as a differentiator since it measures the rate of change of magnitude of the input signal rather than magnitude alone.

The circuit of Fig. 7 for voltage response corresponds to the circuit of Fig. 1 for current response, and, in the same way, Figs. 8 and 9 correspond, respectively, to Figs. 5 and 6. Corresponding numerals are employed to designate corresponding components of the circuits. It will be noted that in each instance the change required for voltage response consists in providing two input terminals instead of one, with the grid of the amplifier connected to the positively changing terminal and the input capacitor $C_i$ connected to the negatively changing terminal.

In response to voltage signals, the rate of change of input voltage is impressed directly between the grid and plate and is reflected by the amplifier tube to the capacitor $C_o$. The relation between input voltage v and $I_o$ is expressed by $$I_o = C_o \frac{dv}{dt}$$

where $$\frac{dv}{dt}$$

is volts per second change of the signal.

Fig. 10 shows another means whereby power amplification in the output may at least in part take the form of voltage amplification. If desired the amplification may be substantially entirely voltage amplification.

In Fig. 10, the grid 55 of an amplifier tube 56 is adapted for positively changing response to a voltage signal in the usual manner and the cathode 57 of the tube is connected to the negative side of a plate supply voltage 58. The anode 59 of the tube may be connected periodically with the positive side of the voltage supply 58 by means of a normally open switch 60.

The output circuit in Fig. 10 includes two capacitors $C'_o$ and $C''_o$ and a suitable measuring device, M, is shown shunting the two capacitors, although it may be connected in series therewith much as the meters M are connected in series with the capacitors $C_o$ in Figs. 7 to 9. The output circuit is coupled with the input signal through an input capacitance $C_i$ with the point of connection between the two capacitors $C'_o$ and $C''_o$ as shown.

$C'_o$ in Fig. 10 corresponds to $C_o$ in the previously described circuits. For high voltage gain, $C''_o$ is preferably much smaller than $C'_o$. The displacement current for both capacitors $C''_o$ and $C'_o$ is the same but the rates at which the voltages change across the two capacitors individually are inversely proportional to their capacitances. The combined voltage change across the two is given by the equation $$\Delta E_p = \Delta E_{C'_o} \frac{C''_o + C'_o}{C''_o}$$

where $\Delta E_p$ = change in plate voltage and $\Delta E_{C'_o}$ = change in voltage across $C'_{o_0}$.

In the discussion of the various circuits to this point, stray input capacitance has been ignored, but, of course, it is always present to some degree. In some practices of the invention for measuring changes in current signals, stray capacitance may be relied upon entirely for the function of $C_1$. Thus, in Figs. 1 and 3 to 7, $C_1$ may be eliminated.

Also, in Fig. 10 the capacitor $C_1$ may be eliminated because capacitive coupling is provided by the capacitors $C'_o$ and $C''_o$, the negatively changing input terminal being in this case connected directly to the circuit point between $C'_o$ and $C''_o$.

The above description in detail of preferred practices of the invention will suggest to those skilled in the art various changes, substitutions, and other departures from the specific circuits.

I claim as my invention:

1. A device for the measurement of an electrical signal comprising the combination of: a signal input circuit including a tetrode vacuum tube having a signal input capacitance and a resistance connected in series between the control grid and the anode of said tetrode; an output circuit comprising a series circuit including the cathode of said tetrode, a source of plate voltage supply, a capacitance, and said resistance in said input circuit; a tube stabilizing circuit comprising a series circuit including a pair of resistances, said last-named series circuit being connected across said plate voltage supply, and the screen grid of said tetrode being connected between said resistances in series; a current measuring device connected in series in said output circuit; and switch means connected in parallel with said capacitance in said output circuit for setting an initial charge on said last-named capacitance and readying said device for operation.

2. A device as defined in claim 1 in which the capacitance in said output circuit is large relative to that of the capacitance in said signal input circuit.

3. In a device for measuring a small input current signal, the combination of: a vacuum amplifier tube having a control grid and an anode; a plate voltage supply; circuit means connecting said anode to the positive terminal of said supply; a signal input capacitor connected in series between said control grid and a point on said circuit means; means for applying said input current to said control grid and said input capacitor; an output capacitor electrically coupled directly to said point on said circuit means whereby said output capacitor continuously undergoes voltage changes equalling voltage changes across said input capacitor; current measuring means in series with said output capacitor; and switch means between said point on said circuit means and said positive terminal, whereby said switch means on being closed sets the charge on said input and output capacitors at an initial condition and on being opened permits said input current to alter the charge on said capacitors, the progressive change of charge on said output capacitor being indicated by said current measuring means.

4. In a device for measuring a small input current signal, the combination of: an input signal circuit including a vacuum tube having a control grid and an anode; a plate voltage supply; connecting means including switch means for connecting the positive terminal of said supply to said anode; a signal input capacitor connected in series between said grid and a point on said connecting means; an output circuit including an output capacitor and a current measuring device in series; and circuit means connecting said anode to said output circuit to control the current in said output circuit, said circuit means comprising means electrically coupling one of the terminals of said output capacitor directly to a point between said switch means and said anode.

5. A device for measurement of an electrical signal comprising the combination of: a signal input circuit including a vacuum amplifier tube having a signal input capacitor connected between the control grid and the anode of said vacuum tube; a plate voltage supply; an output circuit comprising a series circuit including an output capacitor and a current measuring device, said series circuit being connected across said supply; means electrically coupling one terminal of said output capacitor directly to said anode; and switch means between said anode and the positive terminal of said supply for isolating said anode from said supply to permit the voltage across said output capacitor continuously to follow changes in potential of said anode.

6. In a device for measuring a small input current signal, the combination of: an input signal circuit including a vacuum tube having a control grid and an anode; a plate voltage supply; connecting means including switch means for connecting the positive terminal of said supply to said anode; a signal input capacitor connected in series between said grid and said anode; an output circuit including an output capacitor and a current measuring device in series; and circuit means connecting said anode to said output circuit to control the current in said output circuit, said circuit means comprising means electrically coupling one of the terminals of said output capacitor directly to a point between said switch means and said anode.

7. A device for measurement of an electrical signal comprising the combination of: a signal input circuit including a vacuum amplifier tube having a signal input capacitance connected between the control grid and the anode of said vacuum tube; a plate voltage supply; an output circuit comprising a series circuit including the cathode of said vacuum tube, a current measuring device, a capacitance and said anode, said series circuit being connected across said supply; and switch means connected between said anode and said supply for setting an initial charge condition on said input capacitance and on said capacitance in said output circuit.

References Cited in the file of this patent

UNITED STATES PATENTS

| | | |
|---|---|---|
| 2,019,769 | Poole | Nov. 5, 1935 |
| 2,086,965 | Shepard | July 13, 1937 |
| 2,434,297 | Test et al. | Jan. 13, 1948 |
| 2,562,913 | Heeren | Aug. 7, 1951 |
| 2,673,329 | Frommer | Mar. 23, 1954 |